US012523403B2

(12) United States Patent
Kennedy et al.

(10) Patent No.: US 12,523,403 B2
(45) Date of Patent: Jan. 13, 2026

(54) MODULAR REVERSIBLE CASCADE HIGH TEMPERATURE HEAT PUMP SYSTEM WITH PREDICTIVE DEFROST CONTROL

(71) Applicant: Continual Energy Inc., Etobicoke (CA)

(72) Inventors: Philip Kennedy, Etobicoke (CA); Nathan Lavoy, Ottawa (CA); Chadwick Cuirrier, Pickering (CA)

(73) Assignee: CONTINUAL ENERGY INC., Toronto (CA)

( * ) Notice: Subject to any disclaimer, the term of this patent is extended or adjusted under 35 U.S.C. 154(b) by 184 days.

(21) Appl. No.: 18/183,243

(22) Filed: Mar. 14, 2023

(65) Prior Publication Data

US 2023/0288112 A1  Sep. 14, 2023

Related U.S. Application Data

(60) Provisional application No. 63/319,497, filed on Mar. 14, 2022.

(51) Int. Cl.
*F25B 47/02* (2006.01)
*F25B 7/00* (2006.01)

(52) U.S. Cl.
CPC .............. *F25B 47/025* (2013.01); *F25B 7/00* (2013.01); *F25B 2313/029* (2013.01); *F25B 2600/23* (2013.01)

(58) Field of Classification Search
CPC ................... F25B 2313/0251; F25B 2313/025
See application file for complete search history.

(56) References Cited

U.S. PATENT DOCUMENTS

| 5,142,879 A | * | 9/1992 | Nakamura | .............. F25B 13/00 62/211 |
| 5,279,131 A | * | 1/1994 | Urushihata | .............. F25B 13/00 62/468 |
| 6,237,356 B1 | * | 5/2001 | Hori | ........................ F25D 17/02 62/324.1 |
| 9,182,160 B2 | | 11/2015 | Platt | |
| 9,285,128 B2 | * | 3/2016 | Takata | ..................... F25B 13/00 |
| 9,822,995 B2 | * | 11/2017 | Wakamoto | .............. F25B 13/00 |

(Continued)

FOREIGN PATENT DOCUMENTS

JP  2011179692 A  *  9/2011  ............ F25B 47/025

OTHER PUBLICATIONS

Mitsubishi Electric Cooling & Heating, Heating Water with Multi-Purpose Residential Heat Pumps.
(Continued)

*Primary Examiner* — Nelson J Nieves
(74) *Attorney, Agent, or Firm* — Riches, McKenzie & Herbort LLP

(57) ABSTRACT

A heating system having a plurality of outdoor air source heat pumps. An indoor heat transfer system receives heat from the plurality of outdoor air source heat pumps, and uses the heat for a heating application. The heating system is configured to control the plurality of outdoor air source heat pumps so as to reduce an occurrence of the plurality of outdoor air source heat pumps simultaneously being in a defrost cycle. Water to water heat pump(s) are provided in a cascade configuration with the indoor units to produce higher temperature water for the heating application.

21 Claims, 5 Drawing Sheets

(56) References Cited

U.S. PATENT DOCUMENTS

| | | | |
|---|---|---|---|
| 10,982,862 B1* | 4/2021 | Kaiser | F24S 10/748 |
| 2005/0044861 A1* | 3/2005 | Cho | F25B 13/00 |
| | | | 62/81 |
| 2011/0138849 A1* | 6/2011 | Hirano | F28D 15/0266 |
| | | | 62/513 |
| 2012/0031130 A1* | 2/2012 | Morimoto | F25B 41/40 |
| | | | 62/196.1 |
| 2013/0104576 A1* | 5/2013 | Lee | F25B 47/022 |
| | | | 62/272 |
| 2013/0192284 A1* | 8/2013 | Kawai | F25B 43/043 |
| | | | 62/156 |
| 2015/0027154 A1* | 1/2015 | Lee | F25B 13/00 |
| | | | 62/160 |
| 2018/0283752 A1* | 10/2018 | Yoon | F25B 49/02 |
| 2020/0018501 A1* | 1/2020 | Kim | F25B 1/10 |
| 2021/0148585 A1 | 5/2021 | Medlock et al. | |
| 2021/0190402 A1* | 6/2021 | Washiyama | F25B 25/005 |
| 2021/0215383 A1* | 7/2021 | Wada | F25B 13/00 |
| 2022/0042424 A1* | 2/2022 | Radke | F24D 10/00 |
| 2024/0102671 A1* | 3/2024 | Konowalczyk | F24F 11/41 |

OTHER PUBLICATIONS

Mitsubishi Electric, PWFY-P-VM-E-BU.
Trane, Ascend Air-to Water Heat Pump.
Mitsubishi Electric Hybrid VRF, An Application Animation, https://www.youtube.com/watch?v=VK3nAXnWKdo.

* cited by examiner

MODULAR REVERSIBLE CASCADE HIGH TEMPERATURE HEAT PUMP SYSTEM WITH PREDICTIVE DEFROST CONTROL

RELATED APPLICATION

This application claims priority to the Mar. 14, 2022 filing date of U.S. Provisional Patent Application Ser. No. 63/319,497, which is incorporated herein by reference.

FIELD OF THE INVENTION

This invention relates to heating systems, and more particularly to systems that use a plurality of outdoor air source heat pumps.

BACKGROUND OF THE INVENTION

To meet future greenhouse gas emission targets set by many governments and the Paris Climate Agreement, large-scale buildings and campuses must reduce or altogether cease using natural gas for heating purposes. An internationally favored approach is to utilize vapor compression heat pump technology that sources from outdoor air or waste heat in place of fossil fuel burning systems.

The bulk of the commercial heat pump industry uses high-density refrigerants such as R410A and R32 due to the reduced compressor and piping size required and the resulting lower cost of equipment. A characteristic of the high-density refrigerants is the limit to compressor discharge temperature and thus the maximum temperature a heat pump can deliver to a building. The typical limitations of discharge temperature to avoid loss of lubricity of the oil and a progressive wear process occurring leading to premature compressor damage and failure is 107° C. to 130° C. (225° F. to 266° F.).

At the stated discharge temperature limits of a high-density refrigerant system, the practical continuous maximum heating output temperature for a refrigerant to a water heat pump is around 60° C. (140° F.) which is 22° C. (40° F.) below the typical design temperature of the heating system of many existing buildings. Commercially available heat pumps can be implemented into new buildings only when the heat transfer equipment is designed for lower grade heat; however, it is not necessarily applicable to existing buildings which make up the majority of all structures without considerable modifications, cost, disruption, and operational risk, therefore a new solution is required.

The bulk of existing buildings in cold climate regions utilizes heating hot water with design temperatures of 82° C. (180° F.) supply water temperature with a 71° C. (160° F.) return water temperature. The design temperatures were established long ago and function as a safe minimum and maximum operating temperatures associated with noncondensing boilers. As a result of the gas-fired boiler design constraint temperatures a building's heat exchangers, such as air coils in air-handling units, perimeter heat units, radiant heating panels, variable air volume reheat coils, and slab heating connected to the loop also utilized the same temperatures.

Current commercially available heat recovery equipment that can extract heat at low outdoor air temperatures (less than −18° C./0° F.) are limited in the capacity range and temperature range due to the system complexity, compressor, and heat exchanger design. These systems are most often Reversible Air Source Heat Pump or Variable Refrigerant Volume (VRV) systems and require extensive refrigerant piping into a building and may only be connected to indoor air to refrigerant coils and equipment of the same manufacturer due to the proprietary controls fitted to the equipment. Such solutions while operable at low ambient temperatures −30° C.). (−22° cannot displace a boiler and seldom offer condensing (heating) temperatures above 46° C. (115° F.).

Some industrial systems may deliver heat at very low outdoor air temperatures; however, they are not easily commercialized, heavy, require specially trained technicians to service, utilize working fluids (refrigerants) not permitted in commercial buildings, and are often extremely heavy and costly.

It is also common for commercially available technologies to require thermal inertia or buffer tanks as part of the system, with as much as 13 gallons per cooling ton of water storage to avoid frequent and often damaging compressor cycling.

In most cases, a conventional large-scale air-conditioning system utilizes separate heating and cooling systems to produce cold and hot water or hot and cold air. High-temperature heating hot water is produced using natural gas-fired or electric boilers and chilled water is either supplied via an air-cooled or water-cooled chiller system that is separate from the heating system.

In some instances, the heating and cooling loops might be integrated via the use of a heat recovery chiller that creates chilled water and low-grade hot water for use in a building. The heat source of such a heat recovery chiller is typically the building's chilled water loop, exhaust air heat recovery, geothermal loop, outside air, or wastewater. In each case, to provide adequate heat to meet the demand, the heat recovery chiller and the fluids moving through it must be capable of extracting and amplifying the heat at whatever the heat source can deliver. In colder climates, this is seldom the case since the heating loads often far exceed a building's cooling requirement and the use of air-source heat pumps is limited due to compressor operating envelopes.

SUMMARY OF THE INVENTION

To at least partially overcome some of the disadvantages of previously known systems, devices and methods, in one aspect the present invention provides a heating system having a plurality of outdoor air source heat pumps that are controlled to reduce, and preferably prevent, the heat pumps being in a defrost cycle simultaneously.

Defrost cycles are required to remove frost from the outdoor coils of air sourced heat pumps. Frost can form on the outdoor coil under certain conditions of temperature and humidity, and can significantly reduce the efficiency of the heat pump. During the defrost cycle, the heat pump is temporarily operated in reverse, heating the outdoor coil in order to melt the frost.

The inventors have appreciated that staggering the defrost cycles of a group of air source heat pumps, such that any overlap in the defrost cycles is reduced or preferably eliminated altogether, allows the heat pumps to provide an uninterrupted and relatively constant supply of heat to a building. In preferred embodiments of the invention, this allows the heating system to operate without requiring a thermal buffer tank. This can significantly reduce the cost, structural, and space requirements of the system.

In some preferred embodiments of the invention, the system makes use of relatively low cost, commercially available outdoor air source heat pumps. Commercially available off the shelf air source heat pumps typically have internal systems that determine the timing and duration of the defrost cycle. These internal systems are typically inaccessible to the end user, and cannot be easily modified or adjusted.

In preferred embodiments of the invention, the heating system is preferably configured to predict when each of the outdoor air source heat pumps will enter the defrost cycle. The prediction can then be used to adjust the operation of the heating system in order to stagger the defrost cycles. The heating system may, for example, include a processor or processors that use a predictive algorithm in order to predict defrost cycles.

The predictive algorithm is preferably configured to take a variety of different sources of information into account in order to arrive at the predictions. For example, in some embodiments the prediction may take into account one or more of the following pieces of information: the outside air temperature; the outside wind conditions, such as velocity and/or direction; the outside weather conditions, such as humidity and/or precipitation; the heat pump fan speed; the timing of past defrost cycles; the output temperature of the heat pump; and/or the power consumption of the heat pump. This information may, for example, be collected by sensors, such as thermometers, barometers, humidity sensors, and/or wind sensors that are placed in the vicinity of the heating system. Certain information may also be collected directly from the different components of the system, such as the heat pumps themselves, which typically incorporate built in sensors and can provide operation data such as fan speed. Information can also be collected from external sources, such as weather forecasts.

In preferred embodiments of the invention, the heating system incorporates at least one machine learning algorithm that is configured to improve the predictions over time, based on an evaluation of past predictions.

The heating system preferably incorporates at least one controller that is configured to control the operation of the heating system so as to stagger the defrost cycles. The controller may use a variety of different strategies in order to achieve the staggered defrost cycles. For example, the controller may be configured to stagger the start times of at least some of the air source heat pumps. The controller may also temporarily deactivate one or more of the heat pumps, in order to delay the commencement of the defrost cycle. For example, if the system predicts that two heat pumps will enter the defrost cycle at the same time, the system may preemptively deactivate one of the heat pumps. The deactivated heat pump can then be reactivated before the other heat pump enters its defrost cycle. Other strategies for staggering the defrost cycles may include adjusting the heat output and/or output temperature of one or more of the heat pumps.

In preferred embodiments of the invention, the heating system incorporates at least one machine learning algorithm that is configured to improve the system's performance in staggering the defrost cycles over time, based on an evaluation of past performance.

In preferred embodiments, the heating system in accordance with the invention may be used to replace a conventional boiler in a building. The heating system may, for example, use multiple stages of heat gain in order to provide heated water at a temperature that is equivalent to the temperature provided by a conventional boiler. In preferred embodiments, the heating system supplies water at a temperature of about 82 degrees Celsius.

The heating system preferably includes an indoor heat transfer system that receives heat from the plurality of outdoor air source heat pumps, and uses the heat for a heating application, such as heating a building. The indoor heat transfer system preferably includes an indoor heat transfer assembly having at least one indoor heat transfer module. Each indoor heat transfer module preferably receives refrigerant from at least one of the outdoor air source heat pumps, and transfers the heat from the refrigerant to water.

In preferred embodiments of the invention, the indoor heat transfer assembly has a common water input line that provides the water to the at least one indoor heat transfer module, and a common water output line that receives heated water from the at least one indoor heat transfer module. Having a common water input line and a common water output line preferably allows the system to be easily expanded to increase its heating capacity, by allowing additional indoor heat transfer modules to be added to the system merely by connecting to the existing common water input line and common water output line. Additional outdoor air source heat pumps would also be added to the system to provide heat to the newly added indoor heat transfer modules. The indoor heat transfer modules preferably have a modular design, which allows the modules to be stacked adjacent to each other in a daisy chain-like arrangement. The ability to scale the system to typical commercial boiler capacities and the elimination of fluid buffer tanks are important aspects of preferred embodiments of the invention.

The heating system preferably further includes a water to water heat pump that receives the heated water from the indoor heat transfer modules and transfers the heat to higher temperature water, which is then used for the heating application. Preferably, the higher temperature water is heated to a temperature of about 82 degrees Celsius.

Further aspects of the invention include the following:
1. A heating system comprising: a plurality of reversible outdoor air source heat pumps; and an indoor heat transfer system that receives heat from the plurality of outdoor air source heat pumps, and uses the heat for a heating application; wherein the heating system is configured to control the plurality of outdoor air source heat pumps so as to reduce an occurrence of the plurality of outdoor air source heat pumps simultaneously being in a defrost cycle.
2. A heating system, which optionally includes one or more features of any one or more of the previous aspects, wherein the heating system is configured to control the plurality of outdoor air source heat pumps so as to provide an uninterrupted supply of the heat from the plurality of outdoor air source heat pumps to the indoor heat transfer system without requiring a thermal buffer tank.
3. A heating system, which optionally includes one or more features of any one or more of the previous aspects, wherein the heating system is configured to control the plurality of outdoor air source heat pumps so as to prevent more than one of the plurality of outdoor air source heat pumps from being in the defrost cycle concurrently.
4. A heating system, which optionally includes one or more features of any one or more of the previous aspects, wherein the heating system is configured to control the plurality of outdoor air source heat pumps so as to ensure that there is at least a predetermined minimum time interval between the defrost cycles of each of the plurality of outdoor air source heat pumps.

5. A heating system, which optionally includes one or more features of any one or more of the previous aspects, wherein controlling the plurality of outdoor air source heat pumps so as to reduce the occurrence of the plurality of outdoor air source heat pumps simultaneously being in the defrost cycle comprises staggering a startup time of each of the plurality of outdoor air source heat pumps using machine learning and site specific data.

6. A heating system, which optionally includes one or more features of any one or more of the previous aspects, wherein controlling the plurality of outdoor air source heat pumps so as to reduce the occurrence of the plurality of outdoor air source heat pumps simultaneously being in the defrost cycle comprises temporarily deactivating a first one of the plurality of outdoor air source heat pumps in order to delay commencement of the defrost cycle of the first one of the plurality of outdoor air source heat pumps.

7. A heating system, which optionally includes one or more features of any one or more of the previous aspects, wherein the commencement of the defrost cycle of the first one of the plurality of outdoor air source heat pumps is delayed until after the defrost cycle of a second one of the plurality of outdoor air source heat pumps has ended.

8. A heating system, which optionally includes one or more features of any one or more of the previous aspects, wherein the first one of the plurality of outdoor air source heat pumps is reactivated prior to commencement of the defrost cycle of the second one of the plurality of outdoor air source heat pumps.

9. A heating system, which optionally includes one or more features of any one or more of the previous aspects, wherein controlling the plurality of outdoor air source heat pumps so as to reduce the occurrence of the plurality of outdoor air source heat pumps simultaneously being in the defrost cycle comprises adjusting a heat output of at least one of the plurality of outdoor air source heat pumps.

10. A heating system, which optionally includes one or more features of any one or more of the previous aspects, wherein controlling the plurality of outdoor air source heat pumps to reduce the occurrence of the plurality of outdoor air source heat pumps simultaneously being in the defrost cycle comprises adjusting an output temperature of at least one of the plurality of outdoor air source heat pumps.

11. A heating system, which optionally includes one or more features of any one or more of the previous aspects, wherein the heating system is configured to predict when each of the plurality of outdoor air source heat pumps will commence the defrost cycle.

12. A heating system, which optionally includes one or more features of any one or more of the previous aspects, wherein the predictions are based at least in part on an outside air temperature.

13. A heating system, which optionally includes one or more features of any one or more of the previous aspects, wherein the predictions are based at least in part on outside weather conditions.

14. A heating system, which optionally includes one or more features of any one or more of the previous aspects, wherein the predictions are based at least in part on outside wind conditions.

15. A heating system, which optionally includes one or more features of any one or more of the previous aspects, wherein the predictions are based at least in part on a fan speed of each of the plurality of outdoor air source heat pumps.

16. A heating system, which optionally includes one or more features of any one or more of the previous aspects, wherein the predictions are based at least in part on a timing of past defrost cycles of each of the plurality of outdoor air source heat pumps.

17. A heating system, which optionally includes one or more features of any one or more of the previous aspects, wherein the predictions are based at least in part on a power consumption of each of the plurality of outdoor air source heat pumps.

18. A heating system, which optionally includes one or more features of any one or more of the previous aspects, wherein the heating system uses the predictions to determine how to control the plurality of outdoor air source heat pumps so as to reduce the occurrence of the plurality of outdoor air source heat pumps simultaneously being in the defrost cycle.

19. A heating system, which optionally includes one or more features of any one or more of the previous aspects, further comprising at least one machine learning algorithm that is configured to improve the predictions over time, based on an evaluation of past predictions.

20. A heating system, which optionally includes one or more features of any one or more of the previous aspects, wherein the at least one machine learning algorithm is further configured to improve performance of the heating system in reducing the occurrence of the plurality of outdoor air source heat pumps simultaneously being in the defrost cycle, based on an evaluation of past performance.

21. A heating system, which optionally includes one or more features of any one or more of the previous aspects, further comprising at least one machine learning algorithm that is configured to improve performance of the heating system in reducing the occurrence of the plurality of outdoor air source heat pumps simultaneously being in the defrost cycle, based on an evaluation of past performance.

22. A heating system, which optionally includes one or more features of any one or more of the previous aspects, wherein the indoor heat transfer system comprises an indoor heat transfer assembly that comprises at least one indoor heat transfer module; and wherein each indoor heat transfer module receives refrigerant from at least one of the outdoor air source heat pumps, and transfers the heat from the refrigerant to water.

23. A heating system, which optionally includes one or more features of any one or more of the previous aspects, wherein the indoor heat transfer assembly comprises a common water input line that provides the water to the at least one indoor heat transfer module, and a common water output line that receives heated water from the at least one indoor heat transfer module.

24. A heating system, which optionally includes one or more features of any one or more of the previous aspects, wherein the indoor heat transfer system further comprises at least one water to water heat pump that transfers the heat from the heated water to higher temperature water; and wherein the higher temperature water is used for the heating application.

25. A heating system, which optionally includes one or more features of any one or more of the previous aspects, wherein the higher temperature water is heated by the heating system to a temperature that is between 35 and 82 degrees Celsius.

26. A heating system, which optionally includes one or more features of any one or more of the previous aspects, wherein the heating system performs work to transfer the heat from outdoor air to the higher temperature water; wherein the work is split between at least the plurality of outdoor air source heat pumps and the at least one water to water heat pump; and wherein the heating system is configured to adjust a proportion of the work that is performed by the at least one water to water heat pump and by the plurality of outdoor air source heat pumps so as to reduce the occurrence of the plurality of outdoor air source heat pumps simultaneously being in the defrost cycle 27. A heating system, which optionally includes one or more features of any one or more of the previous aspects, wherein the heating application comprises heating a building.

28. A heating system, which optionally includes one or more features of any one or more of the previous aspects, wherein the heating application comprises supplying hot water to a building.

30. A heating system, which optionally includes one or more features of any one or more of the previous aspects, wherein the plurality of outdoor air source heat pumps are reversible.

31. A heating system, which optionally includes one or more features of any one or more of the previous aspects, further comprising a dedicated defrost heat exchanger.

32. A heating system, which optionally includes one or more features of any one or more of the previous aspects, wherein the heating system also provides a supply of chilled water.

33. A heating system, which optionally includes one or more features of any one or more of the previous aspects, the heating system comprising: a plurality of outdoor air source heat pumps; and an indoor heat transfer system that receives heat from the plurality of outdoor air source heat pumps, and uses the heat for a heating application; wherein the indoor heat transfer system comprises an indoor heat transfer assembly that comprises at least one indoor heat transfer module; wherein each indoor heat transfer module receives refrigerant from at least one of the outdoor air source heat pumps, and transfers the heat from the refrigerant to water; and wherein the indoor heat transfer assembly comprises a common water input line that provides the water to the at least one indoor heat transfer module, and a common water output line that receives heated water from the at least one indoor heat transfer module.

34. A heating system, which optionally includes one or more features of any one or more of the previous aspects, wherein the indoor heat transfer system further comprises at least one water to water heat pump that transfers the heat from the heated water to higher temperature water; and wherein the higher temperature water is used for the heating application.

35. A method of retrofitting a building comprising: replacing a boiler with the heating system in accordance with any one or more of the previous aspects.

36. A heating system, which optionally includes one or more features of any one or more of the previous aspects, wherein the indoor heat transfer system comprises: a separate defrost spiral in tube heat exchanger; and a brazed plate heat exchanger for normal operation.

37. A heating system, which optionally includes one or more features of any one or more of the previous aspects, wherein the indoor unit comprises: a separate defrost spiral in tube heat exchanger; and a brazed plate heat exchanger for normal operation

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
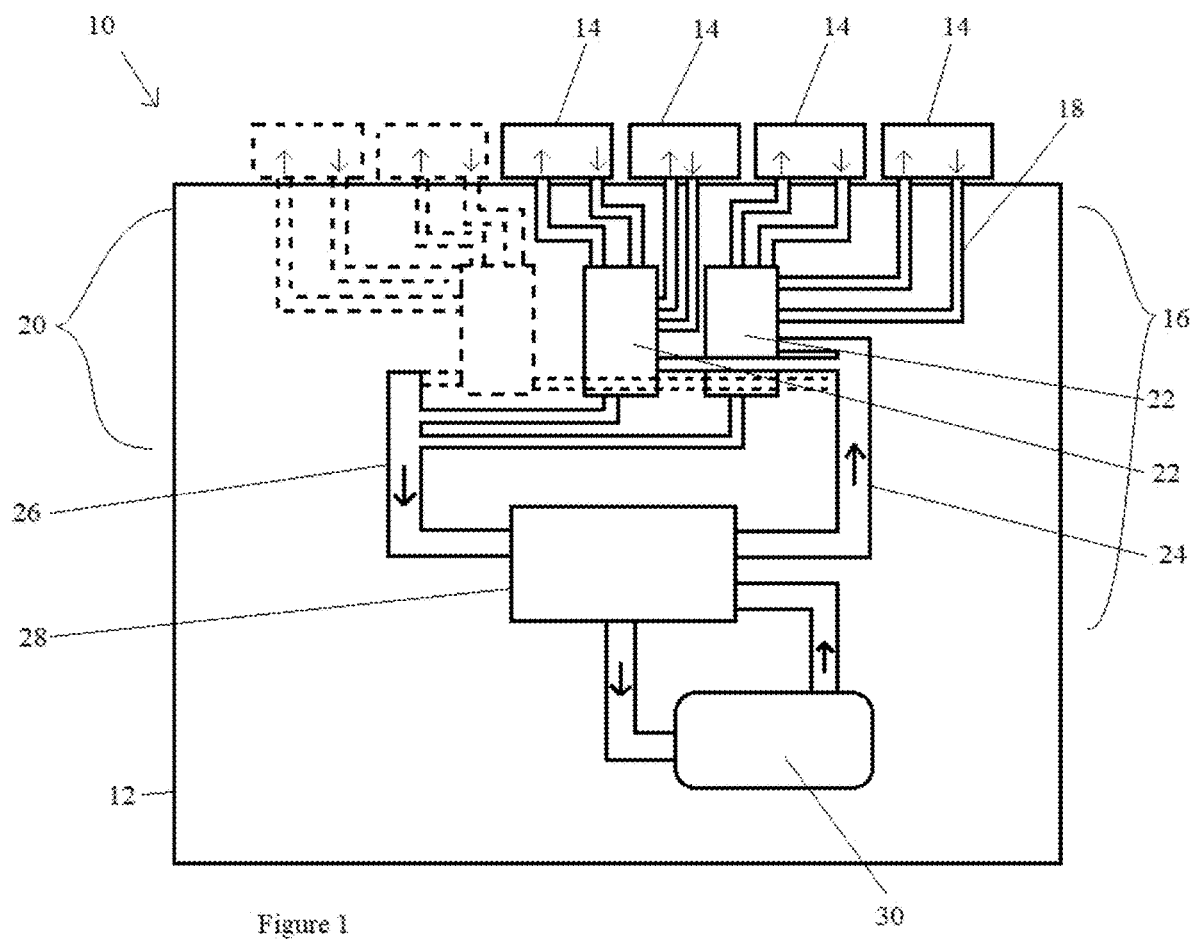
FIG. 1 is a schematic representation of a heating system in accordance with a first embodiment of the present invention.

FIG. 1 shows a heating system 10 in accordance with a first embodiment of the present invention. The heating system 10 is designed to provide heat to a building 12, and includes four outdoor air source heat pumps 14 and an indoor heat transfer system 16.

The outdoor air source heat pumps 14 are installed on the outside of the building 12 for collecting heat from the outside air, and transferring the heat to the indoor heat transfer system 16. Each outdoor air source heat pump 14 has a refrigerant line 18 that circulates refrigerant between the outdoor air source heat pump 14 and the indoor heat transfer system 16. The outdoor air source heat pumps 14 may, for example, be commercially available off the shelf air source heat pumps 14 having a conventional design. The outdoor air source heat pumps 14 are reversible, and have a defrost cycle in which the outdoor coils are heated in order to melt frost that has accumulated on the coils.

The indoor heat transfer system 16 has an indoor heat transfer assembly 20 that includes two indoor heat transfer modules 22. Each indoor heat transfer module 22 receives refrigerant from two of the outdoor air source heat pumps 14, and transfers the heat from the refrigerant to water. The water is supplied to the indoor heat transfer modules 22 from a common water input line 24, and the heated water is collected from the indoor heat transfer modules 22 by a common water output line 26.

The indoor heat transfer system 16 further includes a water to water heat pump 28, which receives the heated water from the common water output line 26 and transfers the heat to higher temperature water. The higher temperature water is then used for a heating application, such as heating the building 12. The heating application is represented schematically in FIG. 1 with the reference numeral 30.

The heating system 10 uses a cascade or multistage structure in order to provide a high grade of heat that is suitable, for example, to replace a conventional boiler. In the first stage, heat is transferred from the outside air to the heated water, and in the second stage the heat is transferred from the heated water to the higher temperature water.

The heating system 10 preferably has a modular design, which allows the system 10 to be easily expanded to provide increased heating capacity. In particular, the use of the common water input line 24 and the common water output line 26 preferably allows additional indoor heat transfer modules 22 to be added to the system 10 without requiring extensive modifications to the system 10. In order to increase the heating capacity, an additional indoor heat transfer module 22 can be connected to the common water input line 24 and the common water output line 26, and additional outdoor air source heat pumps 12 can be installed outside, as is shown in dotted lines in FIG. 1.

The heating system 10 includes one or more processors and/or controllers that are configured to control the heating system 10 in a manner that reduces and preferably eliminates any overlap in the defrost cycles of the outdoor air source heat pumps 14. This preferably allows the group of air source heat pumps 14 to provide an uninterrupted and relatively constant supply of heat to the indoor heat transfer system 16, thus eliminating the need for a costly thermal buffer tank.

The heating system 10 may use a variety of different strategies to stagger the defrost cycles. For example, the heating system 10 may be configured to stagger the startup times of one or more of the heat pumps 14. The system 10 may also be configured to temporarily deactivate one or more of the heat pumps 14. The system 10 may also be configured to adjust the heat output and/or output temperature of one or more of the heat pumps 14, in order to accelerate or decelerate the rate of frost accumulation.

The system 10 may furthermore be configured to adjust the proportion of the work that is done by the first stage of the heating system 10 and the second stage of the heating system 10, in order to accelerate or decelerate the rate of frost accumulation. For example, reducing the output temperature of the air source heat pumps 14 may slow the rate of frost accumulation, and the difference in temperature can be made up by increasing the temperature lift that is provided by the water to water heat pump 28.

Preferably, the system 10 is configured to automatically adjust the proportion of work that is done by the first stage and the second stage in order to maximize the overall efficiency of the system 10.

Preferably, the system 10 makes use of machine learning in order to improve its performance in staggering the defrost cycles over time. The system 10 may, for example, include one or more machine learning algorithms that evaluate the past successes and failures of the system 10 in staggering the defrost cycles, and uses this information to improve the system's control parameters and algorithms. Preferably the system 10 provides a minimum time interval between defrost cycles, such as 4 to 5 minutes.

In some embodiments of the invention, the air source heat pumps 14 may provide little or no warning as to when the heat pumps 14 will enter the defrost cycle. In these embodiments, the system 10 is preferably configured to predict when the heat pumps 14 will enter the defrost cycle, so that this information can be used to adjust the operation of the system 10 to avoid overlapping defrost cycles. The system 10 may, for example, include one or more predictive algorithms that can take a variety of different factors into account in order to predict the defrost cycles.

The system 10 may, for example, take into account factors such as the outside air temperature; the outside weather conditions; the outside wind conditions; the specific locations of the heat pumps 14; the fan speed of the heat pumps 14; the timing of past defrost cycles; and the power consumption of the heat pumps 14.

Preferably, the system 10 makes use of machine learning in order to improve the predictions over time. The system 10 may, for example, include one or more machine learning algorithms that evaluate the past successes and failures of the system 10 in predicting defrost cycles, and uses this information to improve the predictive algorithms over time.

Reference is now made to FIGS. 2 to 5, which show a heating system 10 in accordance with a second embodiment of the invention. Like numerals are used to denote like components.

The system 10 is an all-electric modular & scalable heating and cooling system 10 capable of producing 82.2° C. (180° F.) heating hot water at ambient temperatures down to −30° C. (−22° F.) that includes a reversible air-cooled outdoor unit 14 coupled with modular indoor refrigerant to fluid heat exchanger units 22 and water to water heat pumps 28.

The system 10 is configured to allow simultaneous production of chilled fluid and heating fluid while sourcing heat from the outdoor compressor/coil units 14 and chilled water or heat recovery loop. The system 10 is intended to completely replace traditional heating systems that use fossil fuel combustion to satisfy heating requirements for generating hot water and domestic hot water.

The system 10 allows for simultaneous production of chilled and hot water for air-conditioning and domestic hot water production using a combination of variable refrigerant flow air-source outdoor units 14, modular indoor refrigerant to water heat transfer units 22, and high-temperature water to water heat pumps 28. The system 10 is intended for commercial and institutional buildings where the heating requirement is 100 kW to 3000 kW and utilizes a distributed fluid network in the building.

The system 10 takes advantage of high-volume, low deployment cost commercial outdoor heat pump equipment 14 and pairs it with newly developed refrigerant to water heat exchange units 22 and controls technology employing machine learning and optimization techniques to provide a scalable modular, interconnected system 10 that can displace conventional fossil fuel gas boilers. The system 10 offers several advantages over existing solutions. It does not require any outdoor fluid piping, thus avoiding the need to introduce anti-freeze solutions and heat tracing in the piping. It is, therefore, an ideal solution for existing buildings utilizing boilers in systems that were not designed for glycol and cannot reduce the grade of heat they must operate at without extensive modifications to the heat exchangers external to the heating plant, such as but not limited to fan-coil unit, radiant heating, air-handling unit heating coils, and fluid pumps.

The system 10 provides a significant advantage of eliminating the need for thermal inertia or buffer tanks as part of the system 10. It is common for other commercially available technologies to require as much as 13 gallons per cooling ton of water storage in the primary loop to avoid frequent and often damaging compressor cycling.

The system 10 is a modular system 10 for supplying heating hot water to a building or potable hot water at temperatures comparable to that of a typical propane or natural gas-fired boiler 82.3° C. (180° F.).

The system 10 comprises a reversible air-source heat pump(s) with an indoor mounted energy transfer station(s) 22 and an outdoor installed refrigeration unit 14 consisting of one or more compressors (scroll, screw, centrifugal, spool, or reciprocating), fans, finned heat exchanger coil (copper-aluminum, copper-copper, or aluminum microchannel) and refrigeration components such as but not limited to piping, isolation valves, pressure safety valves, electronic refrigerant control valves, suction line accumulators, liquid receiver vessels, variable frequency drives, and unit controller. The outdoor unit 14 is connected to the indoor unit 22 by multiple copper or stainless-steel pipes through which refrigerant gas and liquid are transferred to the outdoor unit 14 for compression. The indoor unit 22 like the outdoor unit 14 is also reversible and can be operated in cooling or heating mode. The indoor unit's 22 heat exchanger is connected to one or two fluid loops via a grooved or welded piping header arrangement.

The system 10 comprises a scalable/modular water-to-water heat pump 28 with three heat exchangers, connected to three fluid loops via a grooved or welded piping header arrangement. The water-to-water heat pump 28 is capable of operating at high evaporating and condensing temperatures and consists of one or more compressors 42 (scroll, screw, centrifugal, spool, or reciprocating), and refrigeration components such as but not limited to piping, isolation valves, pressure safety valves, electronic refrigerant control valves, suction line accumulators, liquid receiver vessels, variable frequency drives, and unit controller. The water-to-water heat pump module(s) 28 receives warm fluid from the indoor section 22 of the air-source section, the warm fluid acts as a heat load for the evaporator 40 of the water-to-water heat pump 28, the compressor(s) 42 of the water-to-water heat pump 28 elevate temperature and pressure of the refrigerant exiting evaporator 40 supplying high-temperature/high-pressure gas to the condenser 38 which is connected to the heating hot water system of the building. Due to the extreme condensing temperature required to achieve gas boilers like water temperatures a third sub-cooling heat exchanger 44 is included in the design between the condenser 38 and the evaporator 40.

The system 10 also comprises an intelligent machine learning controller at the unitary and supervisory level. The system 10 also includes a four or six pipes reversible heat pump chiller capable of maintaining independent secondary fluid temperature setpoints and thermal unloading at each connected loop.

Figure 2:
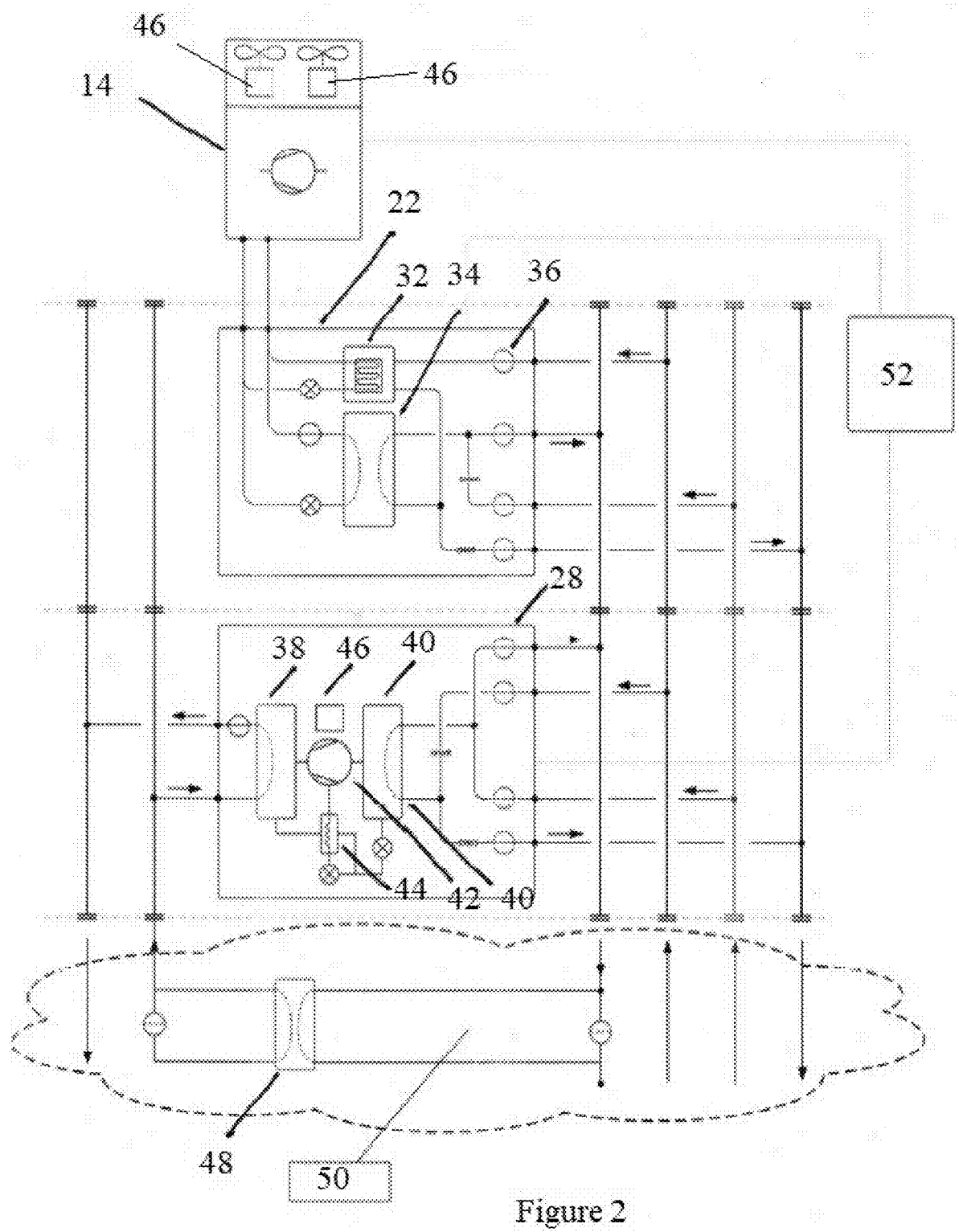
FIG. 2 is a schematic piping diagram of a heating system in accordance with a second embodiment of the present invention.

Referring to FIG. 2, the system 10 includes at least one reversible air-sourced/air-cooled outdoor unit 14, at least one modular indoor heat transfer unit 22, and at least one modular six pipe high temperature water to water heat pump unit 28. The indoor heat transfer unit 22 includes a defrost heat exchanger 32, a dual mode heat exchanger 34, and a two-way modulating valve 36. The water to water heat pump unit 28 includes a condenser 38, an evaporator 40, a compressor 42, a sub-cooler 44, and a variable speed drive 46.

The system 10 optionally includes a heat-recovery heat exchanger 48 and a heat recovery loop 50. The system 10 furthermore preferably uses supervisory optimization and machine learning, which is depicted schematically in FIG. 2 with the numeral 52.

Figure 3:
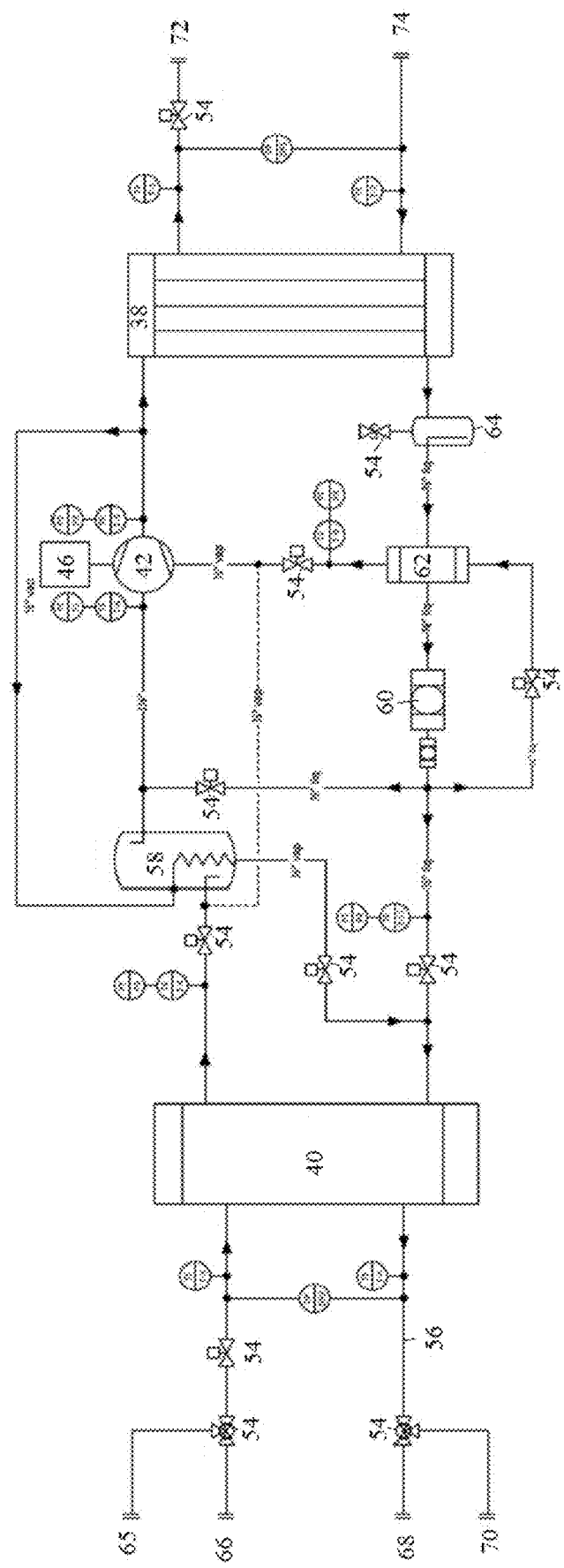
FIG. 3 is a schematic piping diagram of a water to water heat pump of the heating system shown in FIG. 2.

As can be seen in FIG. 3, the water to water heat pump 28 includes an evaporator 40, a condenser 38, valves 54, pipes 56, a suction accumulator 58, a compressor 42, a variable speed drive 46, a filter drier 60, a heat exchanger 62, and a receiver 64. The water to water heat pump 28 has a hot water return 65 of 44 degrees Celsius, a chilled water return 66 of 14 degrees Celsius, a chilled water source 68 of 7 degrees Celsius, a hot water source 70 of 37 degrees Celsius, a heating hot water source 72 of 82 degrees Celsius, and a heating hot water return 74 of 70 degrees Celsius.

In some embodiments of the invention, the modular compact chiller system comprises a reversible air-source heat pump, a condenser heat exchanger, an evaporator heat exchanger, a liquid sub-cooler heat exchanger, two compressors, a defrost heat exchanger, interconnecting piping, controls, and software.

The modular compact chiller system can recover heat from the building water loop through the evaporator, creating chilled water (6.7° C.) and reject the absorbed heat to the outside environment through the reversible air-source heat pump, and can add heat to the building water loop through the condenser heat exchanger, creating heating hot water (44° C.) through heat absorbed by the reversible air-source heat pump from the outside air.

In heating mode, heat is absorbed by the reversible air-source heat pump from the outside environment and is then transferred through the condenser heat exchanger into the heating hot water loop.

In cooling mode, the compact modular chiller absorbs heat from the building cooling loop through the evaporator and is rejected by the reversible air-source heat pump to the outside air through connecting piping.

The modular compact chiller system uses a defrost heat exchanger which enables defrosting of the reversible air-source heat pump outdoor coil during defrosting mode.

The modular compact chiller system can reject heat via compressors into the building water loop creating potable hot water (82° C. setpoints).

Figure 4:
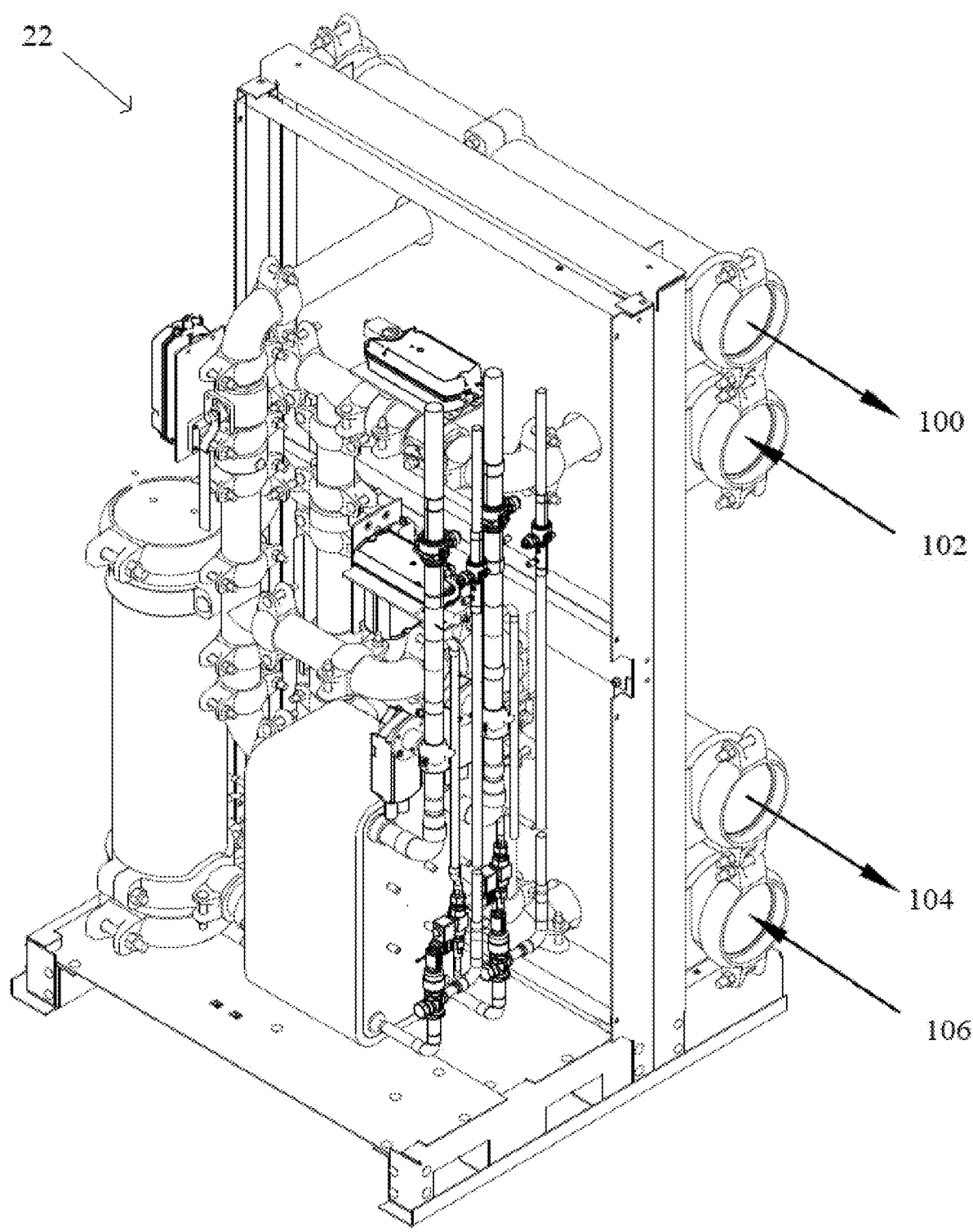
FIG. 4 is a perspective view of a heat transfer module of the heating system shown in FIG. 2.
Figure 5:
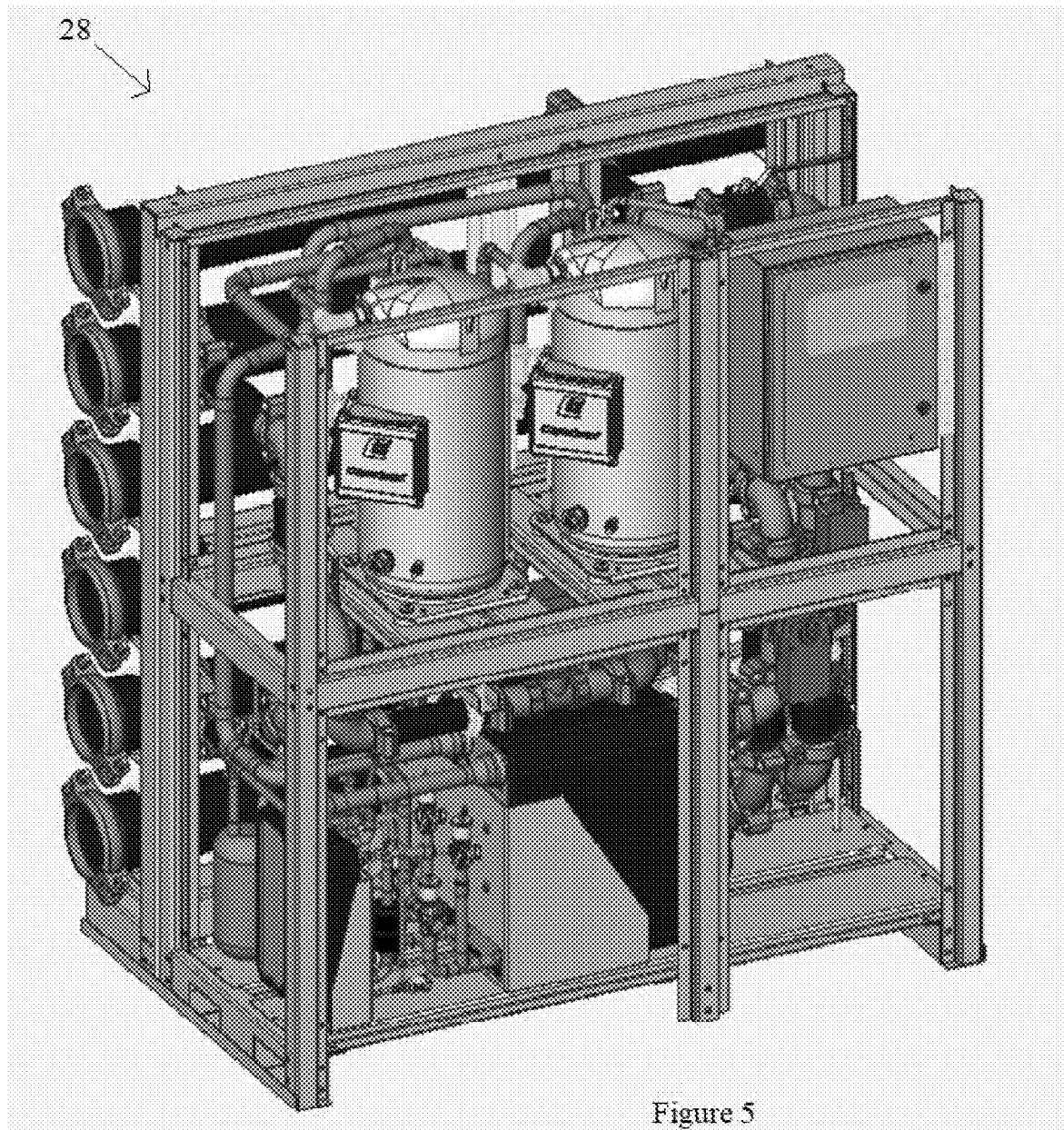
FIG. 5 is a perspective view of the water to water heat pump of the heating system shown in FIG. 2.

In FIG. 4, the numeral 100 represents hot water supply; the numeral 102 represents hot water return; the numeral 104 represents chilled water supply; and the numeral 106 represents chilled water return.

In preferred embodiments, the invention provides one or more of the following:
1. A cascade air-source to water high evaporating & condensing temperature heat pump that is scalable and provides heating and cooling capacities that can be configured to suit design heating and cooling loads.
2. A cascade air-source to water high-temperature heat pump that can be configured side-by-side or back-to-back to optimize available space.
3. A cascade air-source to water high-temperature reversible heat pump that can provide heating hot water and chilled water via a combination of scalable air-source heat pumps, modular indoor or outdoor installed energy transfer, and modular final stage water-to-water heat pumps.
4. A reversible modular remote refrigerant to fluid energy transfer module connected to a grooved or welded piping header containing the building fluid (water or water-glycol) that can operate in cooling or heating mode.
5. A high condensing temperature modular water-to-water heat pump that utilizes a dedicated refrigerant sub-cooler connected to the suction or intermediate port of the compressor that simultaneously controls the density of the refrigerant entering the evaporator and the compressor discharge temperature.
6. A reversible air-source heat pump with a remote energy transfer module (refrigerant to building fluid) that contains a dedicated defrost heat-exchanger.
7. A modular system as described above where any units of different capacities can be arranged and operated together to provide any combination of peak heating or cooling output.
8. An intelligent oil recovery algorithm that does not impact evaporating temperature for variable speed lubricated scroll compressors with onboard oil level sensors. The intelligent algorithm increases the speed of the compressor and the refrigerant velocity through pipes and heat exchangers to promote the return of oil to the compressor sump via the use of an electronic hot-gas valve, variable speed drive, and sensory system. The intelligent oil return algorithm shall utilize an onboard machine learning algorithm to determine the optimum interval to engage the oil return control and minimize the time in the mode.

9. A four or six-pipe modular water-to-water heat pump using an onboard controller with a component performance model and machine-learning algorithm to determine the optimized compressor staging based on communicated system values between similar connected units and outdoor reversible air-source heat pumps (total system performance).

10. A reversible air-source heat pump with a remote or local refrigerant to fluid heat exchanger using an onboard controller to implement a machine-learning algorithm to determine the unit's next defrost cycle. Using this model, connected units will arbitrate a schedule of planned offloading to minimize concurrent defrost periods between units. By minimizing the supply temperature variation, the system will not require external thermal inertia storage.

11. Using decision trees, the onboard controller will continuously relearn the defrost model to account for the degradation of physical components and give an indication of service requirements.

12. When the system has available reserve capacity the onboard controller will increase output to offset the losses of an upcoming defrost cycle.

13. Using a model-based approach with machine learning reinforcement to solve the cost function of a two-stage system operating at two different coefficients of performance (COP). The controller will look to optimize the performance of the total system by optimizing the COP of the two subsystems.

It will be understood that, although various features of the invention have been described with respect to one or another of the embodiments of the invention, the various features and embodiments of the invention may be combined or used in conjunction with other features and embodiments of the invention as described and illustrated herein.

It is to be understood that the invention is not limited to the specific constructions and features shown in the drawings. Rather, any suitable construction or combinations of features could be selected depending on the desired use of the system 10. For example, the system 10 could be adapted to include more than one water to water heat pump 28. In some embodiments of the invention, the water to water heat pump 28 could be replaced by one or more water to low pressure steam heat pumps.

The present invention relates to improvements in reversible heat pump systems with multiple heat exchangers, each serving a different fluid or air system. The invention is mainly directed to heat pumps that need to independently maintain fluid entering and leaving temperatures to each connected loop while maintaining operation during periods with unbalanced evaporator and condenser heat loads.

The invention relates to designing a scalable cascading reversible heat pump system where the heat source may be air-sourced heat pumps or chilled water load and may operate simultaneously. The invention relates to a system 10 where the grade of heat is increased over multiple stages of compression using water or a water-glycol mixture between each stage. Depending on the weather conditions and the grade (temperature) of hot water required and the amount of chilled water heat recovery available the system 10 may operate a single stage or multiple stages of heat gain (cascading).

A byproduct of the process is fluid that can be supplied for cooling purposes simultaneously. The invention encompasses both indoor and outdoor units without the need for glycol and complex piping.

Although this disclosure has described and illustrated certain preferred embodiments of the invention, it is to be understood that the invention is not restricted to these particular embodiments. Rather, the invention includes all embodiments which are functional, electrical, or mechanical equivalents of the specific embodiments and features that have been described and illustrated herein.

We claim:

1. A heating system comprising:
    a plurality of reversible outdoor air source heat pumps; and
    an indoor heat transfer system comprising at least one indoor heat exchanger, which that receives heat from the plurality of outdoor air source heat pumps, and uses the heat for a heating application;
    wherein the heating system is configured to:
    reduce an occurrence of the plurality of outdoor air source heat pumps simultaneously being in a defrost cycle by staggering a startup time of each of the plurality of outdoor air source heat pumps using machine learning and site specific data;
    reduce the occurrence of the plurality of outdoor air source heat pumps simultaneously being in the defrost cycle by temporarily deactivating a first one of the plurality of outdoor air source heat pumps to delay commencement of the defrost cycle of the first one of the plurality of outdoor air source heat pumps;
    reduce the occurrence of the plurality of outdoor air source heat pumps simultaneously being in the defrost cycle by adjusting a heat output of at least one of the plurality of outdoor air source heat pumps to accelerate or decelerate frost accumulation; and/or
    reduce the occurrence of the plurality of outdoor air source heat pumps simultaneously being in the defrost cycle by adjusting an output temperature of at least one of the plurality of outdoor air source heat pumps to accelerate or decelerate frost accumulation.

2. The heating system according to claim 1, wherein the heating system is configured to control the plurality of outdoor air source heat pumps so as to provide an uninterrupted supply of the heat from the plurality of outdoor air source heat pumps to the indoor heat transfer system without requiring a thermal buffer tank.

3. The heating system according to claim 1, wherein the heating system is configured to control the plurality of outdoor air source heat pumps so as to prevent more than one of the plurality of outdoor air source heat pumps from being in the defrost cycle concurrently.

4. The heating system according to claim 1, wherein the heating system is configured to control the plurality of outdoor air source heat pumps so as to ensure that there is at least a predetermined minimum time interval between the defrost cycles of each of the plurality of outdoor air source heat pumps.

5. The heating system according to claim 1, wherein the heating system is configured to reduce the occurrence of the plurality of outdoor air source heat pumps simultaneously being in the defrost cycle by staggering the startup time of each of the plurality of outdoor air source heat pumps using machine learning and site specific data.

6. The heating system according to claim 1, wherein the heating system is configured to reduce the occurrence of the plurality of outdoor air source heat pumps simultaneously being in the defrost cycle by temporarily deactivating the first one of the plurality of outdoor air source heat pumps in order to delay commencement of the defrost cycle of the first one of the plurality of outdoor air source heat pumps.

7. The heating system according to claim 6, wherein the heating system is configured to delay the commencement of the defrost cycle of the first one of the plurality of outdoor air source heat pumps until after the defrost cycle of a second one of the plurality of outdoor air source heat pumps has ended.

8. The heating system according to claim 7, wherein the heating system is configured to reactivate the first one of the plurality of outdoor air source heat pumps prior to commencement of the defrost cycle of the second one of the plurality of outdoor air source heat pumps.

9. The heating system according to claim 1, wherein the heating system is configured to reduce the occurrence of the plurality of outdoor air source heat pumps simultaneously being in the defrost cycle by adjusting the heat output of at least one of the plurality of outdoor air source heat pumps to accelerate or decelerate frost accumulation.

10. The heating system according to claim 1, wherein the heating system is configured to reduce the occurrence of the plurality of outdoor air source heat pumps simultaneously being in the defrost cycle by adjusting the output temperature of at least one of the plurality of outdoor air source heat pumps to accelerate or decelerate frost accumulation.

11. The heating system according to claim 1, wherein the heating system is configured to predict when each of the plurality of outdoor air source heat pumps will commence the defrost cycle.

12. The heating system according to claim 11, wherein the heating system is configured to generate a prediction as to when each of the plurality of outdoor air source heat pumps will commence the defrost cycle based at least in part on one or more of:
- an outside air temperature;
- outside weather conditions;
- outside wind conditions;
- a fan speed of each of the plurality of outdoor air source heat pumps;
- a timing of past defrost cycles of each of the plurality of outdoor air source heat pumps; and
- a power consumption of each of the plurality of outdoor air source heat pumps.

13. The heating system according to claim 11, wherein the heating system uses the prediction to determine how to control the plurality of outdoor air source heat pumps so as to reduce the occurrence of the plurality of outdoor air source heat pumps simultaneously being in the defrost cycle.

14. The heating system according to claim 11, further comprising at least one machine learning algorithm that is configured to improve the prediction over time, based on an evaluation of past predictions.

15. The heating system according to claim 1, further comprising at least one machine learning algorithm that is configured to improve performance of the heating system in reducing the occurrence of the plurality of outdoor air source heat pumps simultaneously being in the defrost cycle, based on an evaluation of past performance.

16. The heating system according to claim 1, wherein the indoor heat transfer system comprises an indoor heat transfer assembly that comprises the at least one indoor heat exchanger; and
wherein each indoor heat exchanger receives refrigerant from at least one of the outdoor air source heat pumps, and transfers the heat from the refrigerant to water.

17. The heating system according to claim 16, wherein the indoor heat transfer assembly comprises a common water input line that provides the water to the at least one indoor heat exchanger, and a common water output line that receives heated water from the at least one indoor heat exchanger.

18. The heating system according to claim 17, wherein the indoor heat transfer system further comprises at least one water to water heat pump that transfers the heat from the heated water to higher temperature water; and
wherein the higher temperature water is used for the heating application.

19. The heating system according to claim 18, wherein the higher temperature water is heated by the heating system to a temperature that is between 35 and 82 degrees Celsius; and
wherein the heating application comprises heating a building.

20. A heating system comprising:
a plurality of reversible outdoor air source heat pumps; and
an indoor heat transfer system comprising at least one indoor heat exchanger, which receives heat from the plurality of outdoor air source heat pumps, and uses the heat for a heating application;
wherein the heating system is configured to control the plurality of outdoor air source heat pumps to reduce an occurrence of the plurality of outdoor air source heat pumps simultaneously being in a defrost cycle;
wherein the indoor heat transfer system comprises an indoor heat transfer assembly that comprises the at least one indoor heat exchanger;
wherein each indoor heat exchanger receives refrigerant from at least one of the outdoor air source heat pumps, and transfers the heat from the refrigerant to water;
wherein the indoor heat transfer assembly comprises a common water input line that provides the water to the at least one indoor heat exchanger, and a common water output line that receives heated water from the at least one indoor heat exchanger;
wherein the indoor heat transfer system further comprises at least one water to water heat pump that transfers the heat from the heated water to higher temperature water;
wherein the higher temperature water is used for the heating application;
wherein the heating system performs work to transfer the heat from outdoor air to the higher temperature water;
wherein the work is split between at least the plurality of outdoor air source heat pumps and the at least one water to water heat pump; and
wherein the heating system is configured to reduce the occurrence of the plurality of outdoor air source heat pumps simultaneously being in the defrost cycle by adjusting a proportion of the work that is performed by the at least one water to water heat pump and by the plurality of outdoor air source heat pumps.

21. The heating system according to claim 1, wherein the indoor heat transfer system comprises:
a separate defrost spiral in tube heat exchanger; and
a brazed plate heat exchanger for normal operation.

* * * * *